Figure 1:
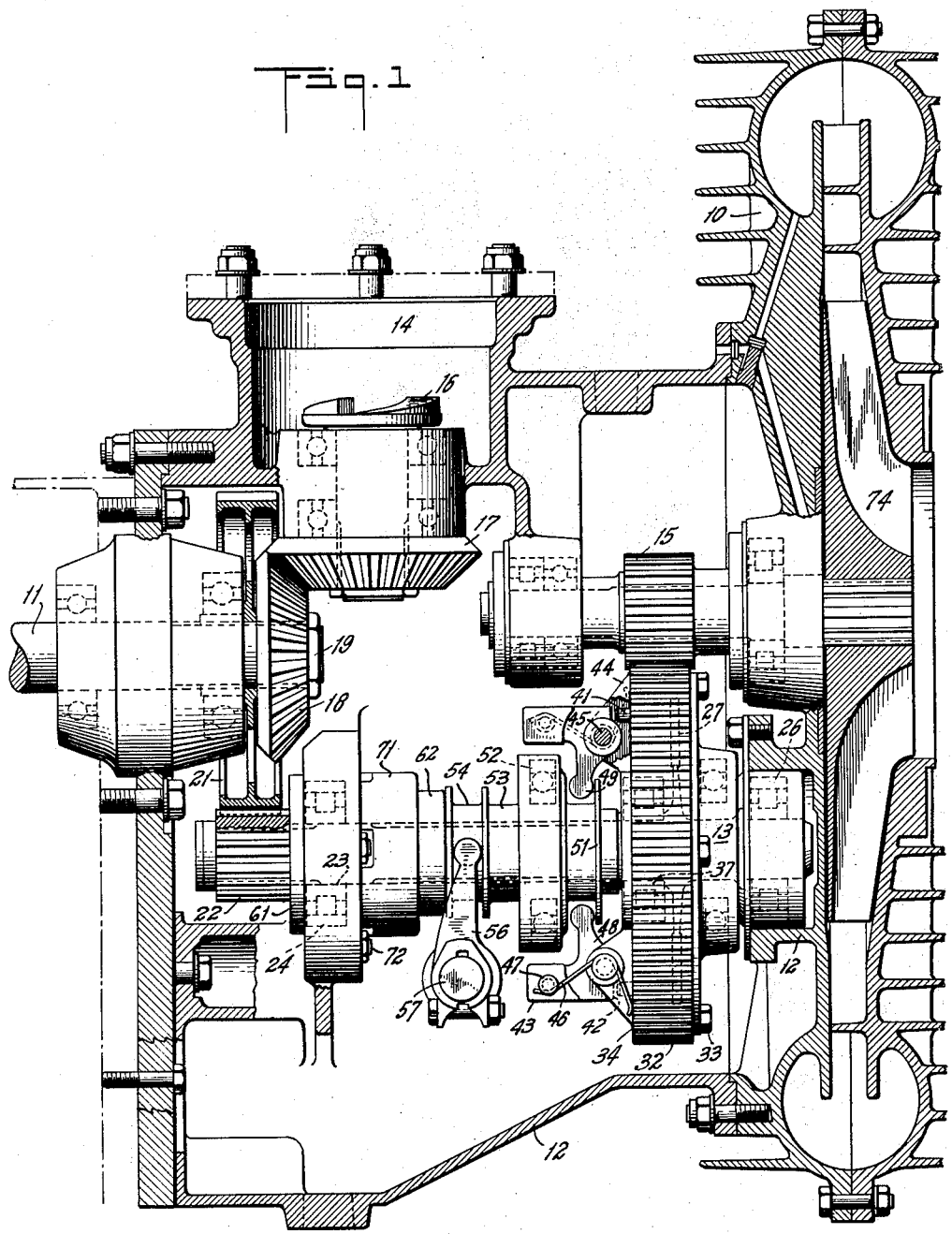

April 21, 1936.　　　D. GREGG　　　2,038,038
CENTRIFUGAL CLUTCH
Filed Oct. 5, 1931　　2 Sheets-Sheet 1

INVENTOR.
David Gregg
BY
F. B. Smith
ATTORNEY.

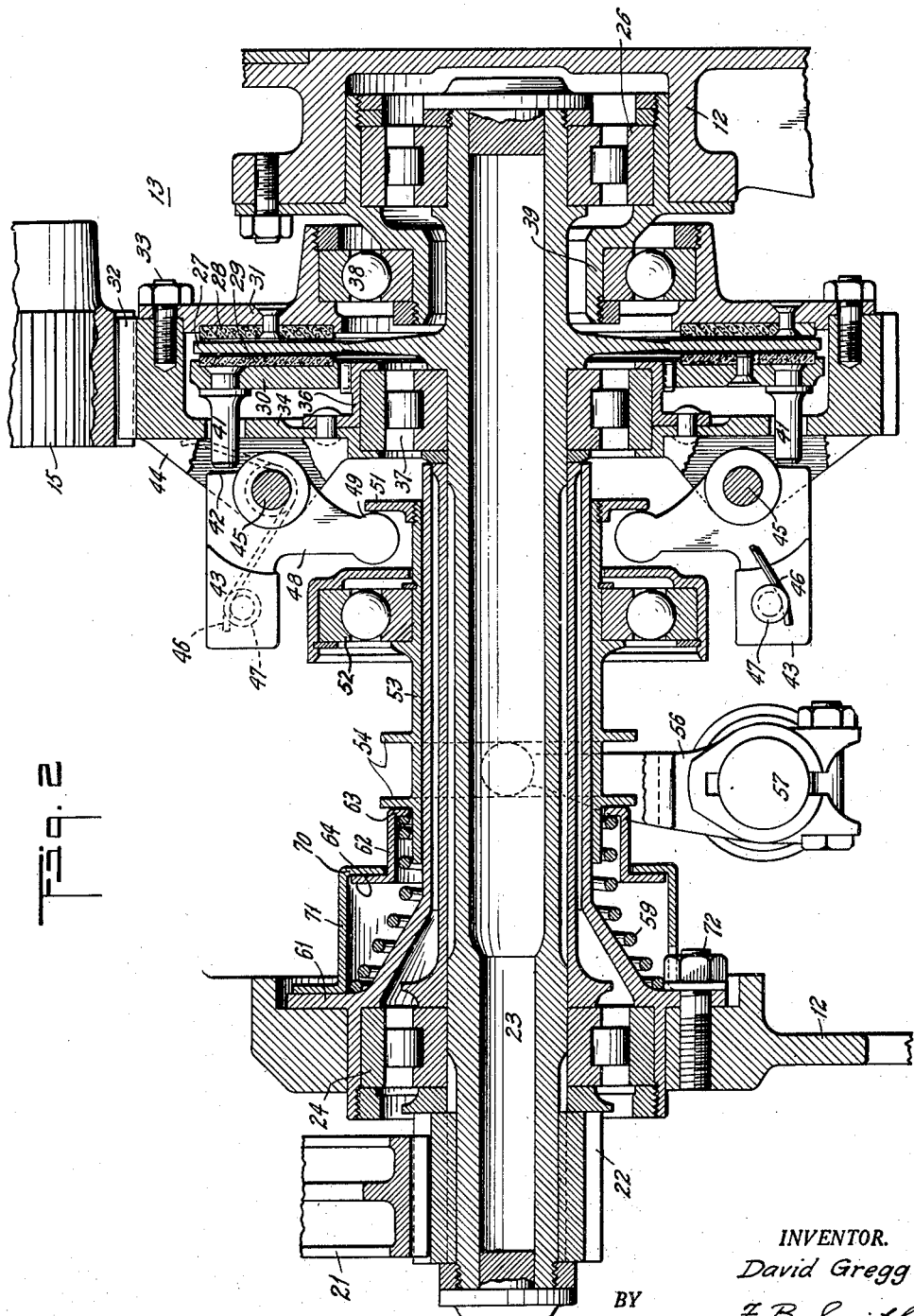

Patented Apr. 21, 1936

2,038,038

UNITED STATES PATENT OFFICE 2,038,038

CENTRIFUGAL CLUTCH

David Gregg, Caldwell, N. J., assignor, by mesne assignments, to Eclipse Aviation Corporation, East Orange, N. J., a corporation of New Jersey Application October 5, 1931, Serial No. 567,088

7 Claims. (Cl. 192—105)

This invention relates to clutches, and more particularly to a control mechanism for a clutch.

In the illustrative embodiment, the invention is shown as incorporated in a centrifugal clutch of the friction type which is responsive to the speed of a driven device exemplified herein as an engine supercharger.

An object of the invention is to provide an improved control mechanism for engaging a clutch.

Another object of the invention is to provide an automatically engageable clutch with a means whereby it may be positively engaged.

Another object of the invention is to provide a centrifugal friction clutch with a control mechanism that reduces clutch friction when the clutch is in its inoperative position.

Another object of the invention is to provide a centrifugal clutch of the friction type that will not become heated in its inoperative position.

Other objects of the invention will appear from the following description, in connection with which an illustrative embodiment which may be preferred is shown in the accompanying drawings, in which:

Fig. 1 is a vertical cross-section of the clutch control as applied to an engine supercharger; and, Fig. 2 is an enlarged sectional view of the clutch mechanism shown in Fig. 1.

In the illustrative embodiment the supercharger, generally designated by 10, is driven by the engine shaft 11 through the medium of a transmission mechanism enclosed in a transmission housing 12 and embodying an automatic clutch device generally designated by 13, having a toothed periphery in mesh with the supercharger drive pinion 15. An engine starting mechanism, not shown, if desired may be installed through the opening 14 at the top of the transmission housing, provision being made for the engagement of the starting device by a ratchet device 16 mounted in suitable bearings within the transmission housing 12 and provided with a beveled gear 17 in mesh with a beveled gear 18 secured by any suitable means, such as splines and nut 19, to the engine shaft 11.

The driving mechanism of the supercharger includes a driving gear 21 secured to engine shaft 11 and meshed with a pinion 22 secured to shaft 23 that is mounted in bearings 24 and 26. A friction disc 27 projects radially from shaft 23 and is adapted in the clutch operative position to engage friction members 28 and 29 disposed on opposite sides thereof and at least one of which is axially movable with respect to disc 27. Friction member 29 is preferably secured to a backing plate 30, while friction member 28 is preferably riveted or otherwise secured to clutch housing 31 having a toothed member 32 secured thereto by any desired means, such as bolt 33. Toothed member 32 has a radial wall 34 in spaced relation to friction member 28 for enclosing disc 27 and the friction members, and has secured thereto an inward extension 36 which has a slidable splined connection with plate 30 and serves to support the clutch upon the shaft 23 by means of bearing 37. The outer end of the clutch is rotatably supported by bearing 38, preferably mounted upon an inward extension 39 of the clutch housing 12.

A plurality of pins 41 are provided about the periphery of friction member 30 which project through suitable openings in side wall 34 in position to be engaged by faces 42 of centrifugal weights 43, angularly spaced with relation to the axis of plate 30. Each weight 43 is pivotally mounted upon the wall 34 by means of ears 44 and a pivot pin 45; the weights being preferably, although not necessarily, urged toward their inner position by springs 46 coacting between the clutch housing and projections 47. Each weight has a projecting arm 48 preferably provided with a ball end 49 intermediate the flange 51 and the thrust bearing 52, both of which are mounted upon an axially slidable sleeve or collar 53 having spaced flanges 54 formed thereon for receiving the end of a manually operable member 56 oscillatable about a shaft 57 rotatably mounted in any fixed part, such as transmission housing 12. Sleeve 53 preferably is urged to its neutral position, as shown in Fig. 2, whereby neither flange 51 nor thrust bearing 52 contacts with lever end 49, by a compression spring 59 coacting between bearing member 61 and a sleeve 62 having its end flange 63 adapted to contact with flange 54 for urging the same toward the neutral position. Sleeve 62 has an outwardly extending flange 64 adapted to contact with the inturned flange 70 of cup 71 that is secured to the transmission housing 12 by any desired means, such as bolt 72; outer flange 70 being preferably so positioned that flange 64 contacts therewith in the neutral position of the clutch, as shown in Fig. 2.

In the operation of the clutch, assuming that engine shaft 11 is rotating and the weights are in the neutral position, as shown in Fig. 2, no motion will be imparted to the supercharger impeller 14, for there is no frictional engagement between friction members 28 and 29 and the driving disc 27. This condition will be maintained indefinitely so long as the weights remain in their neutral position.

If it should be desired to engage the supercharger, manually operable arm 56 is rotated in a counter-clockwise direction, which causes flange 51 to engage weight ends 49 and urge the weights 43 to their outer position against the tension of spring 46 and move member 29 toward member 28 to clamp disc 27 therebetween. Spring 46 is preferably of such tension that for all ordinary driving speeds the centrifugal force of weights 43 is sufficient to maintain the clutch in an engaged position, it being apparent that increased speed will increase the centrifugal force and maintain a frictional engagement adequate to drive the supercharger at the increased speeds.

If it is desired to disengage the clutch, manually operable member 56 is rotated in a clockwise direction, whereby thrust bearing 52 contacts with weight ends 49 and forces the centrifugal weights to their inner or inoperative position. Manually operable member 56 is then held in the disengaging position until impeller 74 has ceased rotation, which results in stoppage of the rotation of clutch 13 and the centrifugal weights 43. After impeller 74 has ceased its rotation, member 56 may be returned to the disengaged position wherein spring 59 prevents the accidental engagement of flange 51 with the weight ends 49.

It may be readily seen that spring 59 maintains the sleeve 53 in its inoperative position and there is no tendency to accidental engagement, and that the supercharger will not be operated until the clutch is positively engaged by the actuation of member 56.

Centrifugal clutches as heretofore used have usually been provided with springs for initially engaging the friction members. This construction is somewhat objectionable in that if for any reason the driven member of the clutch should stop, as for example the breakage of an unimportant part, the springs continue to produce friction and cause heating that is not noticeable until seizure occurs.

The present invention obviates the above mentioned difficulty, and in the stationary position of the clutch the friction members are at all times out of engagement unless thrown into the engaging position by a manual operation.

Various changes may be made in the preferred embodiment illustrated without department from the spirit of the invention. For example, the contacting member of sleeve 53 may engage other portions of the weight 43, and either or both of springs 46 and 59 may be eliminated. If it is preferred to eliminate springs 46, some suitable means for holding such weights 43 as come to rest below shaft 23 against the force of gravity should be incorporated, for example, a tight fit between pin 45 and the weight may be used.

Also, if preferred, the positive disengaging means may be omitted and the clutch released by reducing the speed of the clutch to such a point that springs 46 overcome the centrifugal force and return the weights to their inner position.

Other variations will be apparent to those skilled in the art to which this invention relates, and it is understood that the invention is not limited to the form shown and described, or otherwise, except by the terms of the following claims:

What is claimed is:

1. In a clutch for a driven device, means for automatically engaging the clutch, said engaging means being inoperative while the clutch is stationary, a manually operated member, means secured to the member for initially engaging the clutch to render the automatic engaging means operative, means secured to the members for positively disengaging the clutch, and means coacting with the member for preventing accidental engagement of the clutch including a spring and a stop limiting the expansion thereof at a predetermined point.

2. In a clutch for a driven device, a clutch driven element operatively connected to the device, a driving shaft, cooperative members on the driven element and shaft adapted to be engaged for driving the device, a centrifugal weight pivotally mounted on the driven element adapted to effect engagement of the members, means opposing the centrifugal force of the weight to hold the weight to its inner position below a predetermined speed, manual means for positively engaging the weight on opposite sides thereof to effect the engagement and disengagement of the cooperative members, and means for moving the manual means to a predetermined position in which the weight is held in an inoperative position.

3. In a clutch for a driven device, a clutch driven element operatively connected to the device, a driving shaft, cooperative friction members on the driven element and shaft adapted to be engaged for driving the device, a centrifugal weight pivotally mounted on the driven element adapted to effect engagement of the members, the axis of said mounting lying in a plane at right angles to the shaft, a spring coacting between the weight and the housing to hold the weight to its inner position below a predetermined speed, means for positively engaging and disengaging the cooperative members, and a spring having limited expansive movement for moving the engaging and disengaging means to a position wherein the weight is inoperative.

4. In a clutch for a driven device, a clutch driven element operatively connected to the device, a driving shaft, cooperative friction members on the shaft and driven element, a weight pivotally secured to the driven element adapted to effect engagement of the members, a collar slidable in an axial direction with respect to the driving shaft and adapted to operatively engage the weight to positively rotate it about its pivotal axis to both its operative and its inoperative position, manually operable means for sliding the collar, a spring urging the collar toward its inoperative position, and said spring having a telescopic housing provided with a stop for limiting the spring action at a predetermined point.

5. In a clutch for a driven device, a clutch driven element operatively connected to the device, a driving shaft, cooperative friction members on the shaft and driven element, a plurality of centrifugal weights pivotally mounted on the driven element with their axes in the same plane for engaging the friction members; springs engaging the weights for returning them to their inner positions below a predetermined speed, said weights having inwardly extending projections, a manually operable collar slidable in an axial direction with respect to the shaft and having flanges adapted to engage opposite sides of said projections, and a spring urging said collar toward the weights.

6. In a clutch for a driven device, a clutch driven element operatively connected to the device, a driving shaft, cooperative friction members on the shaft and driven element, a plurality of centrifugal weights pivotally mounted on the driven element with their axes in the same plane for engaging the friction members; springs engaging the weights for returning them to their inner positions below a predetermined speed, said weights having inwardly extending projections, a manually operable collar slidable in an axial direction with respect to the shaft and having flanges adapted to engage opposite sides of said projections, a spring urging said collar toward the weights, and a stop for the last named spring adapted to prevent further movement of the spring when the collar has moved the weights to their inoperative position.

7. In a clutch for a driven device, a driven clutch element operatively connected to the device, a driving shaft, cooperative friction members on the driving shaft and driven element respectively, a weight pivotally secured to the driven member adapted to effect engagement of the members, a collar slidable in an axial direction with respect to the driving shaft and adapted to operatively engage the weight to positively rotate it about its pivotal axis to both its operative and its inoperative positions, manually operable means for sliding the collar, spring means coacting with the weight for urging the weight to its inoperative position, and a second spring urging the collar in a direction to rotate the weight to its inoperative position.

DAVID GREGG.